Dec. 23, 1958 N. CODA ET AL 2,866,136
NETWORK ASSEMBLY
Filed Nov. 9, 1955 2 Sheets-Sheet 1

INVENTORS
Nello Coda
BY Kenneth Challstrom
Ralph Hommar
attorney

Dec. 23, 1958    N. CODA ET AL    2,866,136
NETWORK ASSEMBLY
Filed Nov. 9, 1955    2 Sheets-Sheet 2
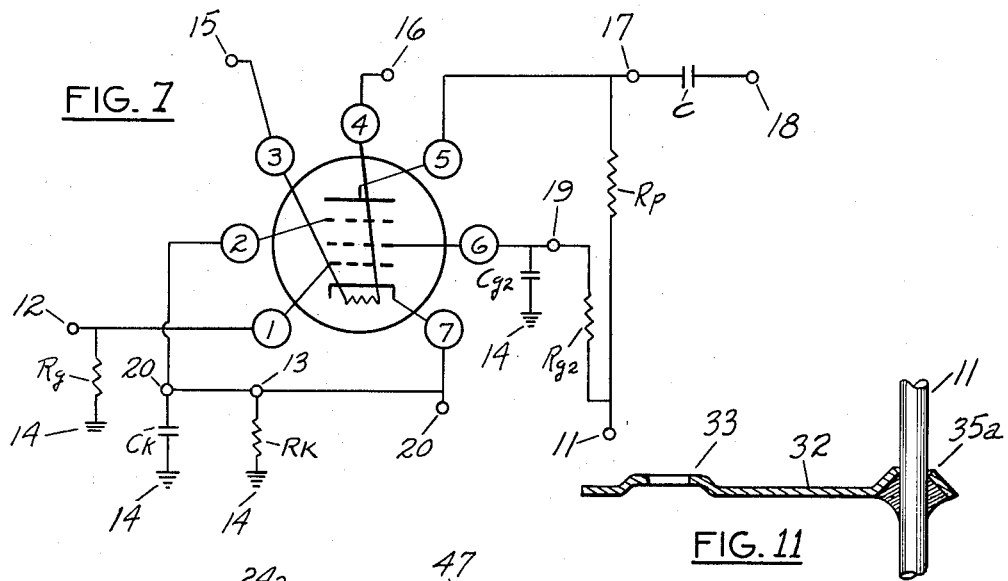
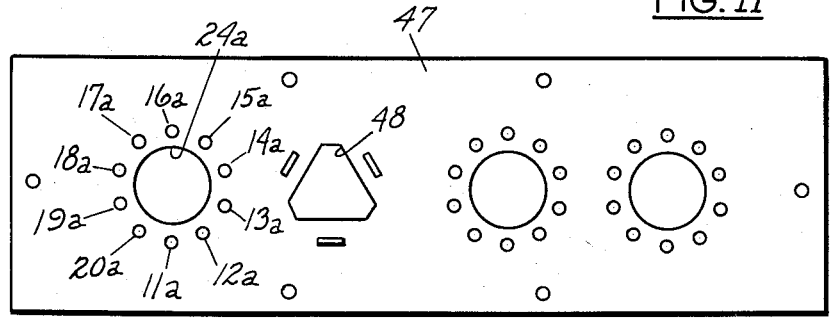
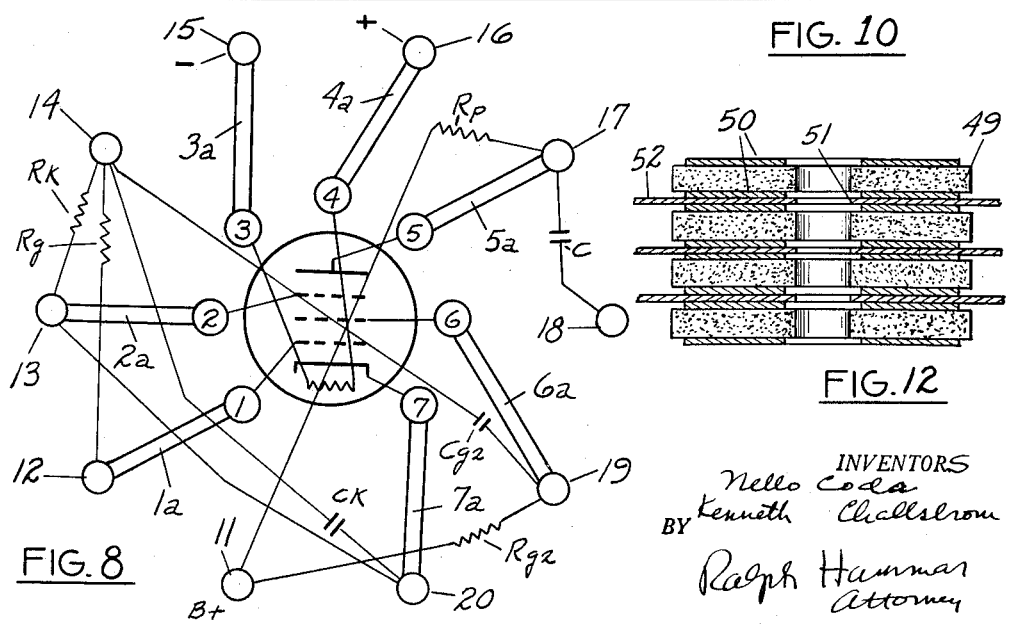

United States Patent Office 2,866,136
Patented Dec. 23, 1958

2,866,136

NETWORK ASSEMBLY

Nello Coda, Erie, and Kenneth Challstrom, North East, Pa., assignors to Erie Resistor Corporation, Erie, Pa., a corporation of Pennsylvania Application November 9, 1955, Serial No. 545,985

8 Claims. (Cl. 317—101)

This invention is an electronic network assembly of a plurality of diverse electric circuit components. In a preferred form the components comprising the input and output circuit elements for a tube are coaxial annular discs arranged in a stack on the under side of the tube socket. Each of the components has terminals or electrodes on its end faces and the connections to the terminals are made by interleaved sheet metal terminals. The connections between circuit elements and socket terminals are made by a squirrel cage of bars surrounding circuit elements. The header which supports the bars can also serve as a mounting for the socket, the socket being on one side of the header and the circuit elements on the other. The ends of the bars projecting up around the socket can serve as contact pins or prongs so the socket and circuit element assembly can be a plug-in unit.

The annular disc form of circuit element is readily adapted to resistors, capacitors, rectifiers and insulators, Components which are difficult to make in the annular disc form may be made in conventional shapes and mounted outside the stack and separately connected to the proper bars of the squirrel cage.

The units may be assembled on a post coaxial with the center bore of the tube socket with solder wafers between adjacent terminals in the stack so the entire assembly can be dipped in hot oil for soldering.

Figure 1:
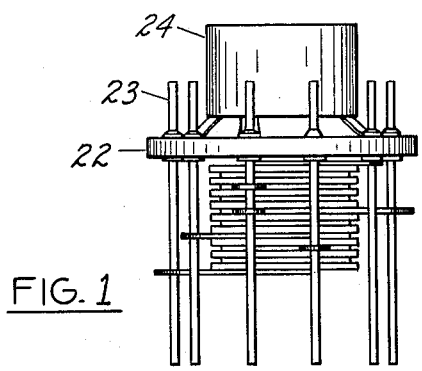
Figure 2:
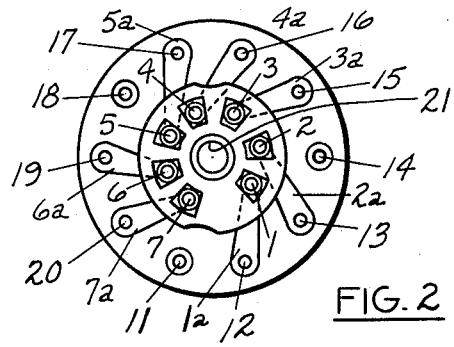
Figure 4:
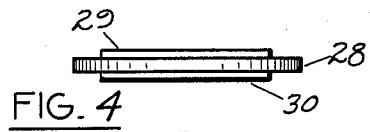
Figure 5:
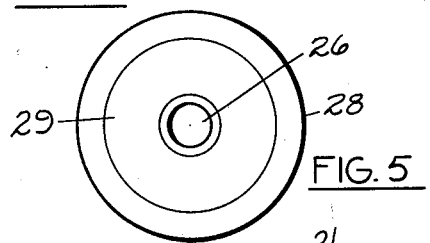
Figure 3:
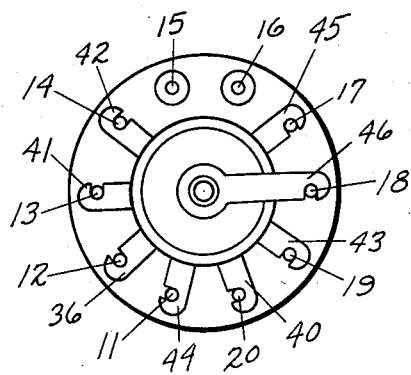
Figure 9:
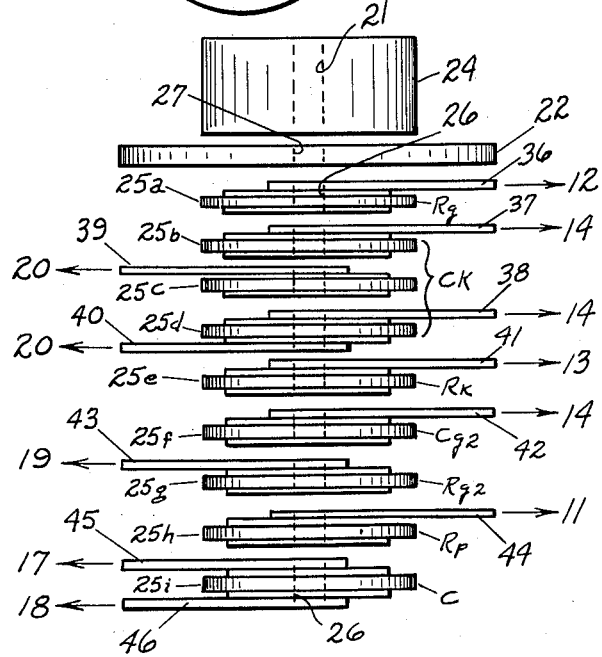
Figure 6:
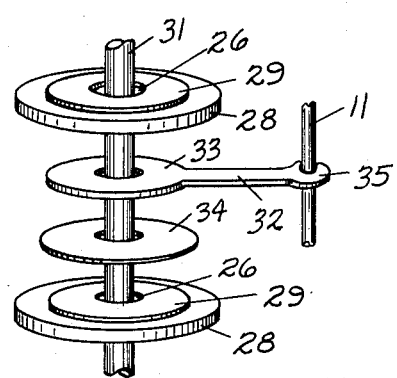

In the drawing, Fig. 1 is a side view of an assembly of a tube socket and of the input and output elements connected to the socket terminals; Fig. 2 is a top view of Fig. 1; Fig. 3 is a bottom view of Fig. 1; Fig. 4 is an edge view of one of the circuit components; Fig. 5 is a plan view of the Fig. 4 circuit component; Fig. 6 is an exploded view illustrating the manner of assembly of the circuit elements; Fig. 7 is a circuit diagram for a tube and the input and output circuit elements connected to the tube; Fig. 8 is an enlarged bottom plan view of the circuit assembly showing the circuit components and interconnections in phantom; Fig. 9 is an enlarged diagrammatic side view of the circuit assembly with the components spread apart; Fig. 10 is a plan view of a mounting plate for a plurality of circuit assemblies; Fig. 11 is a detail of the connection to one of the squirrel cage bars; and Fig. 12 is a section through a resistor.

In the form of the invention illustrated, a tube socket and the input and output circuit components associated with that tube socket form a unitary assembly. The tube socket has socket terminals numbered 1 to 7 inclusive as in the conventional tube base diagram. Around the tube socket is a circular series of bars 11 to 20 inclusive. All of these are concentric with the center bore 21 of the tube socket. A socket without a center bore can be used. The bars 11 to 20 inclusive are carried in a circular header 22 of insulating material, the upper ends 23 of the bars projecting above the header and around the lower end of the socket body 24 and the lower ends of the bars depending from the under side of the header 22 in the form of a squirrel cage surrounding a stack of annular circuit elements 25a to i inclusive. Each of these circuit elements as shown in Figs. 4 and 5 is in the form of an annular disc 28 with a center bore 26 concentric with the center bore 21 of the tube socket. There is also a concentric bore 27 in the squirrel cage header 22 so that when the tube socket, header and circuit elements are assembled, the bores 21, 26 and 27 are in axial alignment. On opposite ends of the circuit element discs 28 are contacts or electrodes 29, 30. The material of the discs will naturally depend upon the nature of the circuit components. If the circuit component is a capacitor, the disc may be of one of the high dielectric constant ceramics. If the circuit component is a resistor, the disc may be a molded body of a plastic binder and resistance particles such as carbon. Inductances can be made of pancake wound coils or of coils printed on ferrite discs. Transformers can be wound on toroidal ferrite cores. These are examples of components having disc like form. It is not necessary that each disc constitute a single electric circuit component. Multiple circuit components such as resistance capacitor combinations and inductance capacitor combinations can be made in the disc form. Rectifier discs can also be made. When it is necessary to separate two portions of the stack, the disc 28 can be an insulator in which case the metallic coatings 29 and 30 merely serve to mechanically anchor the insulator and not for the purpose of making electrical connections.

The disc form of electric circuit component illustrated in Figs. 4 and 5 where the component is perfectly symmetrical about its center bore is well adapted to automatic assembly because the circuit component has properties independent of its angular position and no indexing is required. Also the diameter and thickness of the discs is relatively unimportant. Wide variations in such dimensions can be tolerated. This facilitates the assembly method diagrammatically illustrated in Fig. 6 where the stack of circuit component discs 28 is assembled on a center post 31. Between adjacent circuit elements is a sheet metal stamped terminal 32 having at one end an annulus 33 which fits over the center post 31 and is adapted to make contact to adjacent terminals of the circuit elements. The contact connection can be effected by dip soldering if a washer or wafer 34 of solder is assembled between adjacent circuit elements. When the circuit assembly is completed, the annular portion 33 of the terminal 32 and the solder wafer 34 are sandwiched between adjacent circuit elements so that when the assembly is dipped into hot oil, the solder 34 melts and makes a soldered connection to the adjacent terminals. The stack is kept under endwise clamping pressure while dip soldering and as the solder wafers 34 melt, the components slide along the center post 31 to take up the clearance. At the opposite end of the sheet metal contact 32 is another annular portion 35 which telescopes over one of the bars of the squirrel cage, for example, the bar 11. If the squirrel cage bars are heavily solder coated, the dipping can also effect the solder connection to the bars, particularly if the annular portions 35 of the contacts are conical or have inwardly extending spring fingers 35a which make good contact with the bars. See Fig. 11 for such a construction. Hot oil dipping is not the only way of making soldered connections. Other heating arrangements such as rod heaters in the center bore of the stack may be used. Soldering may be entirely omitted and pressure contact used. There obviously may be more than one sheet metal contact 32 in case the common terminal between the adjacent circuit elements will be connected to more than one of the squirrel cage bars 11 to 20 inclusive. Also, there is no limit to the number of terminals which may be connected to any particular one of the bars 11 to 20 inclusive in which case a plurality of the circuit elements will be connected in parallel. It is also possible to cut one of the bars between two terminals and thereby use a single bar in two electrically independent parts of a circuit. This provides a flexible arrangement which is readily adapted to the great majority of electronic networks.

Figs. 7 and 8 show the application of the network assembly to an amplifier circuit using a 6–AU–6 tube. In this tube, the socket terminal 1 is connected to the grid; socket terminal 2 to the suppressor grid; socket terminals 3 and 4 to the cathode heater supply circuit; socket terminal 5 to the plate; socket terminal 6 to the screen grid and socket terminal 7 to the cathode. For convenience in Fig. 7, the socket terminals are marked on Fig. 7 in the same manner as the conventional tube base diagram. When a 6–AU–6 tube is plugged into the tube socket, the corresponding pins on the tube base are received in the socket terminals 1 to 7 inclusive and make the above described connections to the elements of the tube. On the under side of the tube socket are terminal lugs 1a to 7a inclusive which make the electrical connections to the correspondingly numbered tube socket terminals 1 to 7 inclusive. The lugs 1a to 7a can be printed or mounted on the header 22 instead of being part of the tube socket. Since the electrical connections to the tube socket are to be made through the network assembly, the terminal lugs 1a to 7a inclusive are connected to the appropriate bars 11–20 in the squirrel cage surrounding the electric circuit components. In the particular amplifier illustrated, the terminal lug 1a is connected to the squirrel cage bar 12; the terminal lug 2a is connected to the bar 13; the terminal lug 3a is connected to the bar 15; the terminal lug 4a to the bar 16; the terminal lug 5a to the bar 17; the terminal lug 6a to the bar 19 and the terminal lug 7a to the bar 20. It will be noted that no terminal lug connections are made to bars 11, 14 and 18. These additional bars 11, 14 and 18 are not needed to make the connection to the tube socket but are convenient to make circuit interconnections to the circuit components. In general there will be more squirrel cage bars than socket terminals so as to permit standardization even though in any particular network assembly some of the bars may be idle. That is the present practice in the tube sockets where it is quite common to have one or more pins to which no connection is made.

In order to tie in the diagram 7 with the parts of the circuit assembly, the circuit diagram of Fig. 7 has been marked at corresponding points with the number of the bars 11 to 20 inclusive of the squirrel cage. The amplifier input is connected to squirrel cage bar 12 and the amplifier output appears at squirrel cage bar 18. Squirrel cage bars 13 and 20 are connected to each other and respectively to the cathode resistor RK and the cathode condenser CK. The grid leak RG is arranged between squirrel cage bar 12 and squirrel cage bar 14 which is externally connected to ground. Squirrel cage bars 15 and 16 are connected externally to the cathode heater supply. The amplifier output capacitor is connected between squirrel cage bars 17 and 18. The screen grid capacitor Cg–2 is connected between squirrel cage bar 19 and squirrel cage bar 14. The screen grid resistor Rg–2 is connected between squirrel cage bar 19 and squirrel cage bar 11. The plate resistor RP is connected between bar 17 and bar 11. The bar 11 is externally connected to the plate supply voltage. The circuit element interconnections described are shown in phantom on the enlarged bottom plan view of Fig. 8 of the network assembly.

Fig. 9 shows the relative position of the components and terminals although the components have been spread apart for convenience. This is a diagrammatic view in which the terminals making the connections between the network components and the squirrel cage bars are brought into the plane of the paper and the outer end of each of the terminals is labeled with the bar to which it is connected. Although all of the terminals shown in Fig. 9 are of the same construction as the terminal illustrated at 32 in Fig. 6, each of the terminals will be given a different reference numeral. In Fig. 9 the grid leak resistance Rg comprises the disc 25a made of a resistance material. The upper side of this disc is connected by sheet metal terminal 36 to the squirrel cage bar 12 and the lower side of this disc is connected by sheet metal terminal 37 to squirrel cage bar 14. The capacitor CK comprises three discs 25b, 25c and 25d of ceramic electroded on opposite faces. The ground terminal of this capacitor CK comprises two terminals 37 and 38 which are connected to squirrel cage bar 14. It will be noted that terminal 37 is common to the grid leak Rg. The cathode terminal of the capacitor comprises terminals 39 and 40 which are connected to squirrel cage bar 20. The use of the two terminals connected to the same bar illustrates the manner of making parallel connections. The cathode resistor RK comprises the disc 25e made of resistance material. The upper side of this disc is connected to squirrel cage bar 20 by terminal 41. Terminal 41 is in contact with terminal 40. This illustrates the technique for connecting a component to two different squirrel cage bars. The common ground terminal of the cathode resistor RK and of the screen grid capacitor Cg–2 (disc 25f) is terminal 42 connected to squirrel cage bar 14. The lower side of the screen grid capacitor and the upper side of the screen grid resistance 25g are connected to squirrel cage bar 19 by terminal 43. A common terminal 44 for the lower side of the screen grid resistor 25g and the upper side of the plate resistor 25h is connected to squirrel cage bar 11 which is externally connected to the plate voltage. The output capacitor C which comprises ceramic disc 25i is connected to the plate resistor by terminal 45 connected to squirrel cage bar 17 and is connected to the output squirrel cage bar 18 by terminal 46. The soldered connections between the terminals 36 to 46 inclusive and the adjacent component electrodes or terminals is not shown. Fig. 9 does illustrate the arrangement of the components in the stack and the interconnections by interleaved sheet metal terminals leading to the squirrel cage bars effected as the stack is compressed.

There are a number of ways in which the network assembly may be mounted in a chassis. For example, as shown in Fig. 10, the chassis may have a plate 47 of insulating material having punched holes for receiving the network assembly. For the particular network so far described the plate 47 would have a center hole 24a for receiving a body 24 of the socket and around the center hole 24a would be a series of holes 11a to 20a inclusive for receiving the upper ends of the correspondingly numbered bars of the squirrel cage. In such a mounting the socket would project up through the plate 47 and the assembly of network components would depend from the under side of the plate. This arrangement is adapted to printed wiring where the conductors for making the interconnections of network assemblies would be on one or both sides of the mounting plate. For the particular network assembly described, the printed wiring could be on the upper side of the mounting plate 47 and the projecting upper ends of the squirrel cage bars 11 to 20 inclusive could be connected to the printed wiring. The input and output would be connected to bars 12 and 18; the filament voltage supply would be connected across bars 15 and 16 and the plate voltage would be connected to bar 11 and bar 14 would be grounded. The remaining bars would not be connected into the wiring.

Because the projecting ends of the squirrel cage bars resemble contact prongs, it is possible to have the parts 11a to 20a inclusive contact prong receiving contacts in a suitable socket base. Then the entire assembly could be plugged in. This would mean that the network assemblies would be removed and replaced in the same manner as vacuum tubes.

It is not necessary that the mounting holes in the plate 47 have a circular shape. At 48 is shown a triangular mounting hole for another form of plug-in component. The network assemblies need not be restricted to association with vacuum tube sockets. The squirrel cage provides a convenient mounting for devices having the function of vacuum tubes, e. g., germanium diodes, transistors.

The spacing of the circuit component discs is the thickness of the sheet metal terminals 36—46 plus the solder connection. If greater spacing is required, for example for heat dissipation, the portions 33 of the terminals can be dished to secure greater spacing or separate spacers can be added. Another way of increasing the heat dissipation is shown in Fig. 12 where a stack of annular discs 49 of resistance material have annular metal terminal coatings 50 on opposite end faces with annular metal fins 51 interleaved between adjacent discs and having rims 52 projecting outside the stack. This is an ideal construction for resistors. The greatest heat is at the center and the coatings 50 and the fins 51 both act to prevent hot spots at the center which would cause failure. The assembly is not limited to soldered connections. Interleaved spring contacts can be used or pressure contact can be obtained by clamping the stack axially, for example, by riveting.

Because all of the connections to the circuit components are outside the stack, the squirrel cage may be omitted and the terminals 36—46 may be made long enough to be connected directly to the socket terminals 1a—7a or to each other as required. That is, the stack of assembled circuit elements with the projecting leads 36—46 is a useful sub-assembly. In fact all of the components for an entire radio chassis could be arranged in a single stack and the projecting leads connected to the terminals of the tube sockets and other separately manufactured parts.

What is claimed as new is:

1. A network assembly comprising a plurality of coaxial disc circuit components of assorted kinds of electrical function stacked in end to end relation, the discs having axially spaced coaxial annular electrodes on end faces of the discs whereby connection thereto may be made in any angular position of the discs and with the material giving the respective components the unlike electrical characteristics lying between the electrodes, leads interleaved between the discs and having coaxial annular inner ends making contact with adjacent electrodes and having outer ends projecting outside the stack for connecting the components into a circuit, and soldered joints between the leads and electrodes holding the stack in assembled relation.

2. A modular electric circuit assembly comprising a plurality of unlike circuit components of assorted kinds of electrical functions, each component being of disc form and the discs being stacked in end to end relation, the discs being of material suited to the electrical functions of the respective components and having end faces provided with electrodes or terminals, leads interleaved between the discs and having inner ends connected to adjacent electrodes and having outer ends projecting outside the stack, means interconnecting certain of the outer ends of the leads to make electrical connections between desired components, means for making connections to the assembly through the outer ends of the leads, and means for holding the stack in assembled relation.

3. The assembly of claim 2 in which the discs and electrodes and the inner ends of the leads are of annular form so that the discs and terminals can be stacked on a spindle.

4. The assembly of claim 3 in which the leads and terminals are soldered together to hold the stack in assembled relation and the spindle is withdrawn after assembly.

5. The assembly of claim 2 in which the connections to the outer ends of the leads are made to angularly spaced axially extending bars surrounding and spaced radially outward from the stack.

6. The assembly of claim 5 in which the bars are supported by and extend away from one end of a tube socket, said tube socket having a body with a center bore surrounded at one end by tube prong receiving contacts and with contact terminals extending away from the other end of the body, and connections between said terminals and the bars whereby the module comprises the circuit associated with a tube plugged into the socket.

7. The assembly of claim 6 in which the one end of the bars extends axially up around the body of the tube sockets so as to be accessible for making connections to a wiring board on which the tube socket is mounted.

8. The assembly of claim 2 in which the circuit components are disc capacitors of dielectric material and disc resistors of resistance material.

References Cited in the file of this patent

UNITED STATES PATENTS

| | | |
|---|---|---|
| 1,042,432 | Hadaway | Oct. 29, 1912 |
| 1,419,099 | Axen | June 6, 1922 |
| 2,047,796 | Ogg | July 14, 1936 |
| 2,383,735 | Ray | Aug. 28, 1945 |
| 2,408,052 | Enderlin | Sept. 24, 1946 |
| 2,493,199 | Khouri | Jan. 3, 1950 |
| 2,547,405 | Mitchell | Apr. 3, 1951 |
| 2,696,577 | Smith | Dec. 7, 1954 |
| 2,744,214 | Di Marco | May 1, 1956 |
| 2,752,537 | Wolfe | June 26, 1956 |
| 2,758,262 | Geisselsoder | Aug. 7, 1956 |

FOREIGN PATENTS

| | | |
|---|---|---|
| 518,127 | Great Britain | Feb. 19, 1940 |
| 532,248 | Great Britain | Jan. 21, 1941 |

OTHER REFERENCES

"Radio-Electronic Engineering," December 1953, pp. 12, 13, 30.